No. 607,411. Patented July 12, 1898.
M. P. HAYDEN.
RUBBER FLOWER HOLDER.
(Application filed July 2, 1897.)
(No Model.)

Witnesses
F. B. Berry,
Victor J. Evans

Inventor
Martha P. Hayden,
by John Wedderburn.
Attorney

UNITED STATES PATENT OFFICE.

MARTHA P. HAYDEN, OF JOLIET, ILLINOIS.

RUBBER FLOWER-HOLDER.

SPECIFICATION forming part of Letters Patent No. 607,411, dated July 12, 1898.

Application filed July 2, 1897. Serial No. 643,259. (No model.)

*To all whom it may concern:*

Be it known that I, MARTHA P. HAYDEN, of Joliet, in the county of Will and State of Illinois, have invented certain new and useful Improvements in Rubber Flower-Holders; and I do hereby declare the following to be a full, clear, and exact description of the invention, such as will enable others skilled in the art to which it appertains to make and use the same.

This invention relates to flower or bouquet holders, such as are worn on a lady's dress or the lapel of a gentleman's coat.

The invention consists, essentially, of a wire frame or base against which flowers are to be supported, an elastic band arranged across the frame or base for clasping the stems and holding the flowers against their support, and means for attaching the holder to wearing-apparel, consisting of an attachment to the frame operating in the manner of a safety-pin.

The invention further consists in the combination, with the frame and attachment above referred to, of a shield or dress-protector consisting of satin or any desired fabric, the frame and the fabric being connected together in any suitable way.

The purpose of the invention is the production of a neat and inexpensive device adapted to clasp and hold flowers or bouquets firmly against a supporting-base and the whole to be readily connected with a dress or coat where the flowers or bouquets will be securely held in position.

Figure 1:
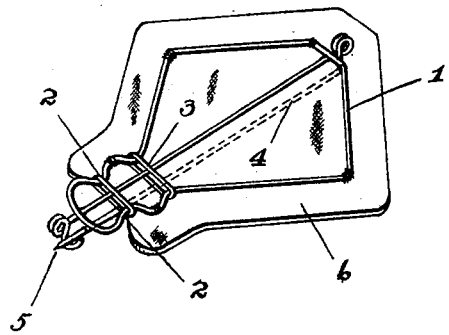
Figure 2:
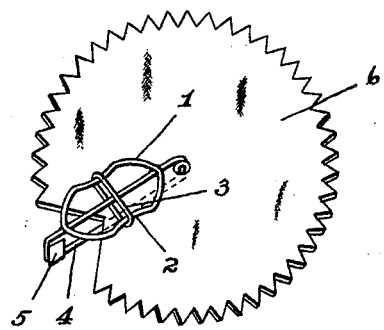
Figure 3:
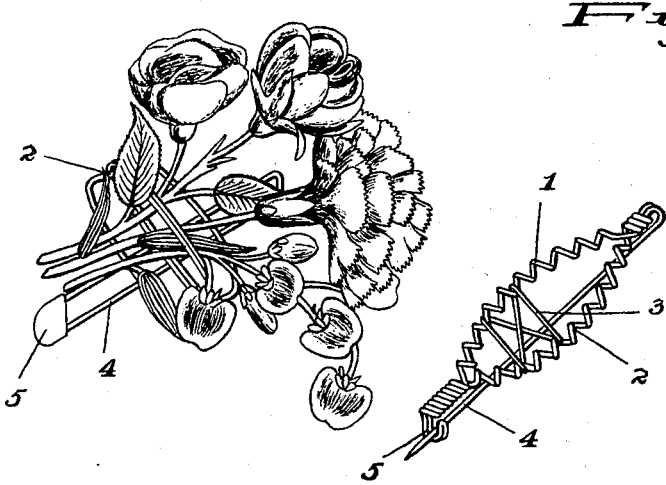
Figure 4:
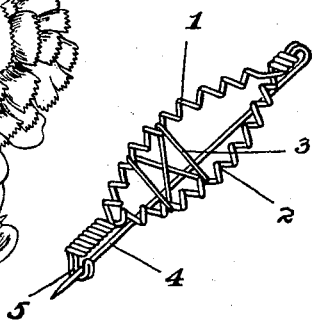
Figure 5:
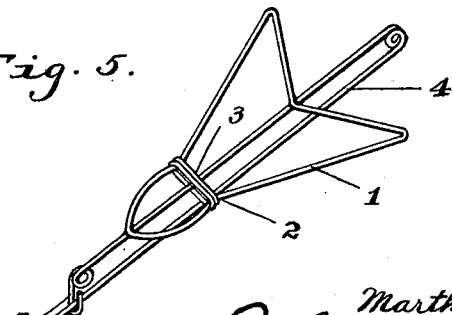

In the drawings forming part of this specification, Figure 1 shows in perspective one form of my invention with the protecting shield or fabric connected to the frame. Fig. 2 is also a perspective view of another form or style of my invention, also connected with the shield or dress-protector. Fig. 3 is a perspective view of another style of holder without the shield or protector. Fig. 4 illustrates another, and Fig. 5 still another, example of my invention.

1 is a wire frame formed into any desirable shape, either rectangular, oval, or triangular, or, indeed, any shape which will give a frame or base of such dimensions as will prevent twisting or rocking of a bouquet or flower when attached to clothing. The frame part is provided with bends or depressions 2 2 for receiving and retaining an elastic band 3. This elastic band serves the function or purpose of clamping and holding a bouquet or flower firmly against the frame or base whenever the same is introduced within said band. Coupled with the frame or formed integrally from the wire of the frame is a pin 4, which engages with a catch 4 like that used in connection with safety-pins, the catch also being attached to or formed as a part of the frame. The fabric 6, which constitutes the shield or protector, may be connected to the frame by stitching directly to the frame part, as shown in Fig. 1, or by being connected at the bend or hinge of the safety-pin, as shown in Fig. 2, or it may be connected with the frame in any suitable or convenient manner.

When the holder is made with coils at the eye of the hinge on the upper end and at the lower end adjacent to the hook for the pin, said coils can be made in either direction. Such coils should be made to correspond with each other in appearance for purposes of artistic effect. When the flowers are in place, however, the upper part of the holder will not be visible.

Having thus described the invention, what is claimed as new, and desired to be secured by Letters Patent, is—

1. A flower-holder, consisting of a wire frame to serve as a base or support for the flowers, said frame having a pair of opposite indentations in its longer sides, an elastic band seated in the indentations to grasp the stems of the flowers, and means for attaching the holder to wearing-apparel, substantially as described.

2. A combined flower-holder and dress-protector, consisting of a wire frame having longitudinally opposite bends or indentations in its sides, an elastic band seated in the indentations across the frame, a shield of flexible material connected with the frame and means for attaching the shield and holder to wearing-apparel, substantially as described.

In testimony whereof I have signed this specification in the presence of two subscribing witnesses.

MARTHA P. HAYDEN.

Witnesses:
JNO. B. FITHIAN,
WILLIAM D. HEISE.